Sept. 20, 1966 R. J. ANETSBERGER 3,273,488
BASKET RAISING MECHANISM FOR TWIN FRYERS
Filed March 15, 1965 3 Sheets-Sheet 1
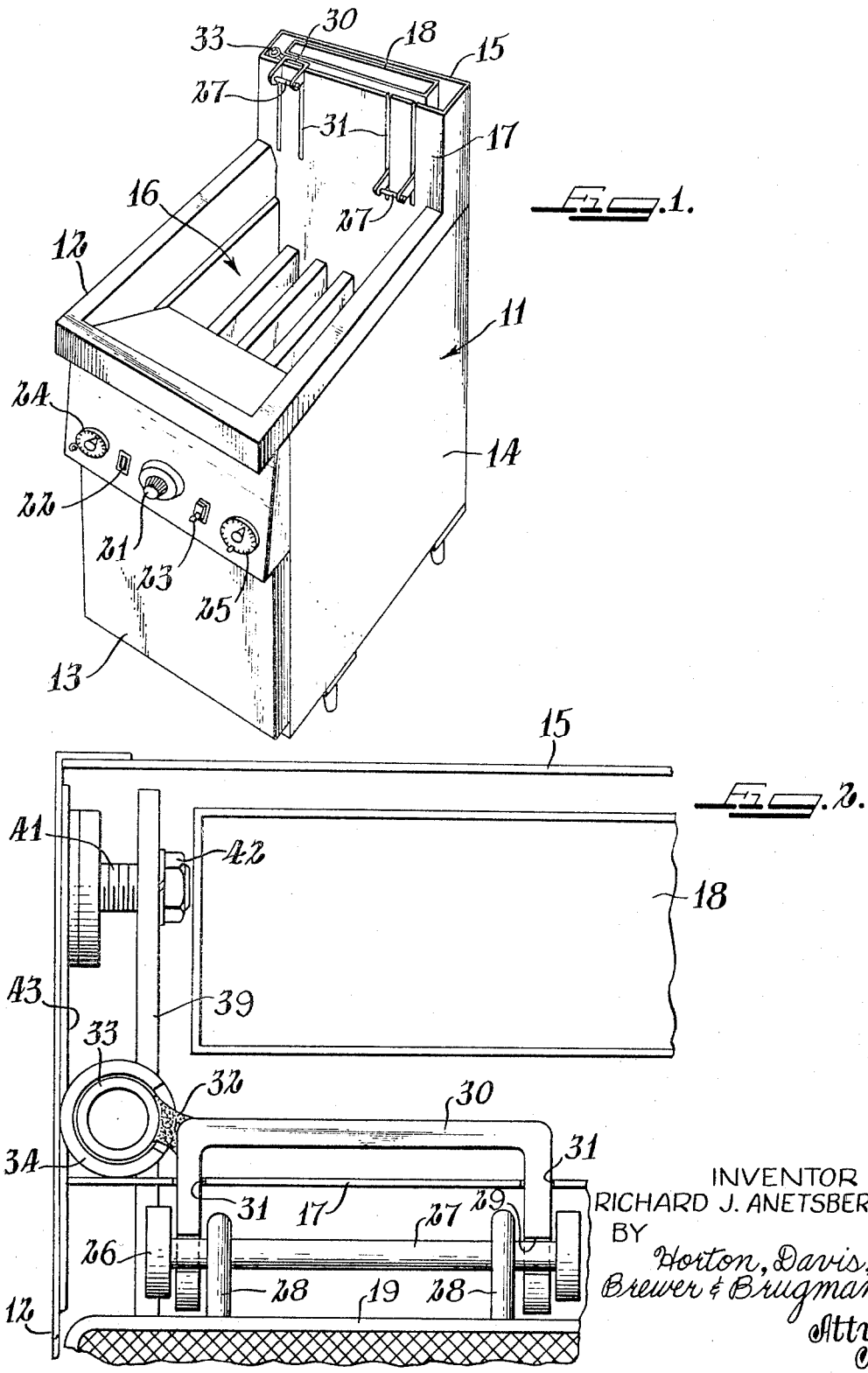
INVENTOR
RICHARD J. ANETSBERGER
BY
Horton, Davis,
Brewer & Brugman
Attys.

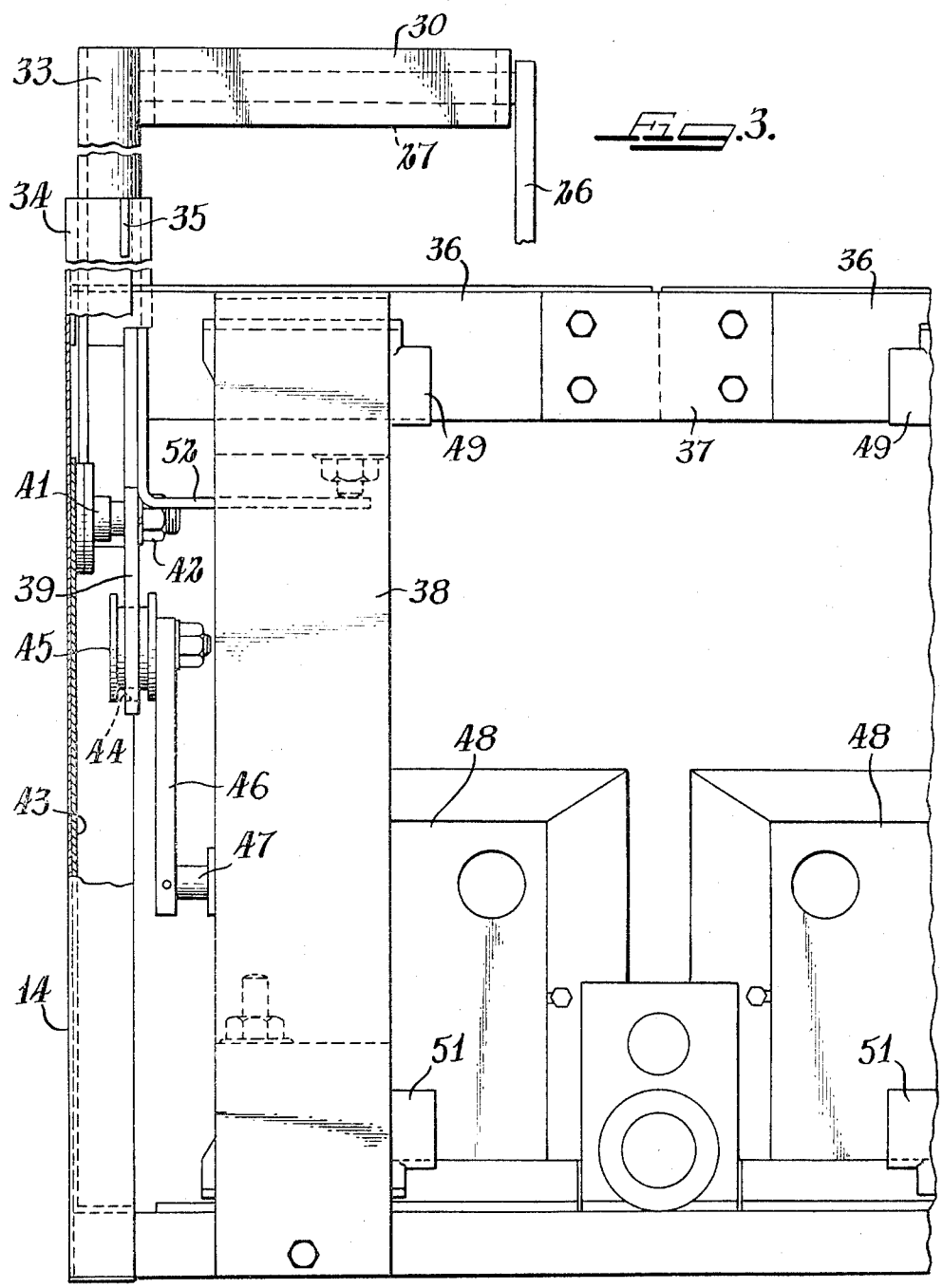

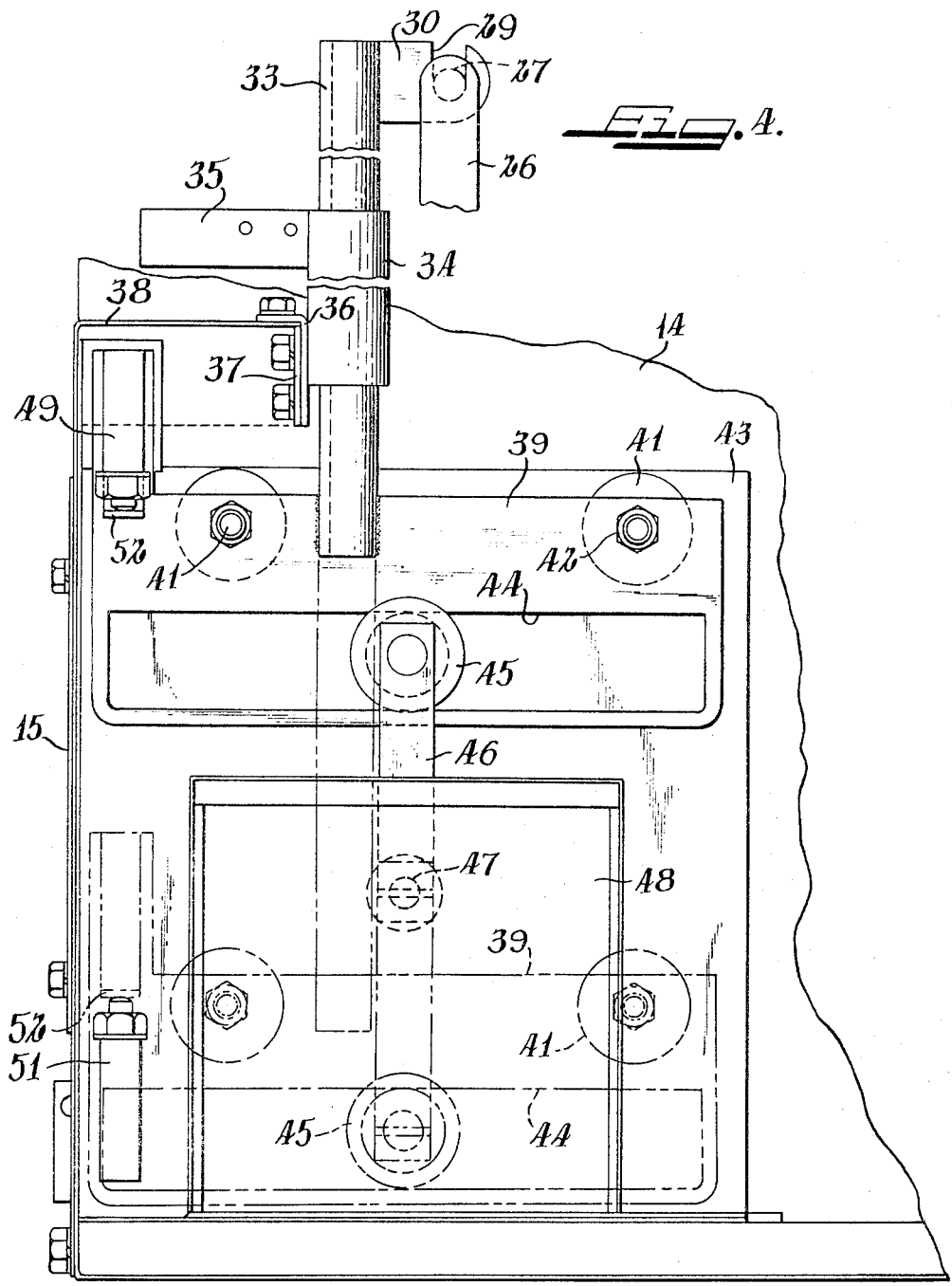

United States Patent Office 3,273,488
Patented Sept. 20, 1966

3,273,488
BASKET RAISING MECHANISM FOR TWIN FRYERS
Richard J. Anetsberger, Northbrook, Ill., assignor to Anetsberger Brothers, Inc., Northbrook, Ill., a corporation of Illinois
Filed Mar. 15, 1965, Ser. No. 439,596
4 Claims. (Cl. 99—407)

This invention relates in general to deep fat fryers, and more particularly to novel means for moving twin food-supporting baskets in such a fryer vertically independently of each other.

Lifting or lowering and raising mechanisms have been provided for deep fat fryers, such as that disclosed in my copending application Serial No. 105,214, filed April 24, 1961, (now Patent No. 3,217,633 which issued November 16, 1965), but when a plurality of baskets are used therewith, the baskets are moved thereby simultaneously.

A principal object of this invention, therefore, is to enable the twin baskets of a deep fat fryer to be used independently of each other without requiring the same to be immersed into and lifted from the fat manually.

Another important object is to maintain the established maximum width for such a deep fat fryer to facilitate substitution or replacement thereby for prior art fryers of similar size. This is extremely desirable because most such deep fat fryers are mounted for use in substantially lateral contact with similar fryers or other cooking or food serving equipment in limited space, but it requires all of the operating mechanism to be disposed between or within the confines of the side walls of the fryer.

A further important object of the invention is to avoid any obstruction with a venting hood cooperating with the flue of the fryer by the means for independently moving the twin baskets vertically, and to so position the latter as to prevent its distortion or warping due to the heat of the flue.

Applicant's solution to the problems presented has been to provide novel basket raising mechanisms for twin basket deep fat fryers comprising a lifting rod disposed forwardly of the flue and adjacent each side wall of the casing and a hanger offset inwardly from each rod for independently supporting one of the basekts.

Since this causes the weight of a basket and any food supported thereby to apply a bending moment or torque to the lifting rod, another very important object of this invention is to overcome the deleterious effects of such torque, prevent binding of the lifting rod, and insure smooth and even vertical movements of the basket.

This has been attained by providing a novel lifting rod guide arrangement comprising a cylindrical sleeve for the round rod, and adjustable guide pads mounted on the lower end of the rod in spaced relationship forwardly and rearwardly thereof and slidably cooperating with a vertical wear plate disposed laterally outwardly thereof to counteract or resist the torque applied to the rod by the associated food-supporting basket.

Numerous other objects and advantages of the invention will be apparent as it is better understood from the following description, which, when taken in connection with the accompanying drawings, discloses a preferred embodiment thereof.

In the drawings:

FIGURE 1 is a perspective view of a deep fat fryer embodying the features of the invention;

FIGURE 2 is a detail plan view, with parts omitted, of a rear corner portion of the fryer of FIGURE 1;

FIGURE 3 is a rear view of the fryer of FIGURE 1 with the rear wall and one of the basket raising and lowering mechanisms omitted; and FIGURE 4 is a vertical sectional view through the center portion of the fryer of FIGURE 1, as seen from the left side therof (from the left side of FIGURE 2 and from the right side of FIGURE 3), and showing the right-hand basket raising unit, with parts omitted for the sake of clarity.

Referring more particularly to the drawings, reference numeral 11 indicates in general a deep fat fryer comprising an outer casing made up of a left side wall 12 (FIGURE 2), front wall 13, right side wall 14 (FIGURE 1) and rear wall 15. Disposed interiorly of this casing 11 is a kettle, indicated generally by reference numeral 16, which includes a rear wall 17 and may be formed and mounted in the casing in the manner disclosed in my said copending application Serial No. 105,214. Also as shown in greater detail in that application, the instant fryer includes a vertically extending flue 18 disposed in spaced relationship to and between the rear wall 17 of the kettle and the outer rear wall 15 of the casing 11 and having an open upper end.

The present invention is directed to novel means for moving twin food-supporting baskets in such a fryer vertically independently of each other. In the embodiment herein illustrated, two such food-supporting baskets 19 (FIGURE 2) are employed in side-by-side relationship and have such horizontal dimensions as to permit independent movements thereof vertically into and out of the cooking fat customarily provided in the kettle 16. In connection with the latter, it will be understood that suitable burner means, not illustrated herein, are disposed within the casing 11 below the kettle 16 which may be similar to those disclosed in said application Serial No. 105,214.

The instant fryer also contemplates the provision of well-known thermostatic control means for controlling the operation of such burner means to maintain the cooking fat at any preselected temperature, which is manually settable by means of a thermostatic control 21 mounted on a panel of the front wall 13. Also mounted on this panel are the usual heat indicating light 22, a master switch 23, and a pair of cycle timers 24 and 25 selectively settable to control, respectively, the immersion periods of the two food-supporting baskets 19 and including starting switches to initiate immersion of the baskets in the cooking fat in the kettle 16.

The two mechanisms employed for independently supporting, lowering and raising the baskets 19 are identical to each other, except that the one associated with the left-hand basket 19 is disposed adjacent the left wall 12 of the casing and extends inwardly therefrom, while that associated with the right-hand basket is disposed adjacent the right side wall 14 and extends therefrom toward the middle of the fryer. Consequently, only one of these basket raising mechanisms will be described and the same reference numerals will be applied to corresponding parts of both.

As best seen in FIGURES 2 and 4, each such basket raising mechanism comprises a hanger 26 including a cross rod 27 on which the standard rearwardly extending hooks 28 on a food-supporting basket 19 may be engaged in well-known manner. The cross rod 27 is removably disposed in, extends through and is supported by suitable slots 29 in the laterally spaced, forwardly extending arms of a U-shaped bracket 30 which are disposed in vertical slots 31 in the rear wall 17 of the kettle 16. This bracket 30 is secured at its outer rear corner, as by means of welding as shown at 32 in FIGURE 2, to the upper end of a vertically disposed lifting rod 33.

The upper portion of the lifting rod 33, which may be made in the form of a cylindrical tube if desired, is engaged and guided by a surrounding tube 34. The upper end of this guide tube 34 is secured to and supported by a suitable bracket 35, and its lower end is secured in any suitable manner to the outer end portion of a transversely extending angle bar 36. The angle bars 36 of the two raising and lowering mechanisms extend inwardly adjacent the front wall of the flue 18, but below the same in the lower part of the casing 11, into substantial abutting relationship to each other, and are secured together by means of a tieplate 37 (FIGURES 3 and 4). A horizontally disposed flange of each angle bar 36 is secured to a rearwardly extending and horizontally disposed upper end of a bracket 38, the major portion of which is vertically disposed along and secured to the rear wall 15 of the casing 11.

The lower end of the lifting rod 33 is secured in any suitable manner, as by welding, to a longitudinal extending plate or movement-imparting member 39 near its upper edge. This plate 39 is provided with a pair of adjustable guide pads 41, each of which comprises an enlarged head portion at its outer end faced with a coating of suitable antifriction material, and a threaded shank screwed through a tapped aperture in the plate 39. The inner end of the threaded shank of each pad is adapted to receive a suitable lock nut 42 to maintain the outer end of the pad in proper adjusted position relative to the plate 39. These guide pads 41 are disposed, respectively, adjacent the front and rear ends of the plate 39 in spaced relationship on opposite sides of the lifting rod 33. Wear means in the form of a vertically disposed plate 43 is secured to the inner surface of each of the side walls 12 and 14 of the casing 11 in any suitable manner and extending from adjacent the rear wall forwardly and from the uppermost position of the guide pads 41 downwardly so as to be frictionally engaged by the pads 41 during vertical movements of the basket raising mechanisms.

The lower portion of the movement-imparting member or plate 39 is provided with a cam slot 44 which is engaged by, and cooperates with, a flanged roller 45 rotatably mounted in any suitable manner on the outer end of a crank arm 46 which, in turn, is secured at its other end in well-known manner to the shaft 47 of an electric motor 48. The two motors 48 are mounted in the lower portion of the casing 11 at the rear thereof below the burners and the lower end of the flue 18.

With this arrangement, it will be seen that operation of the motor 48 resulting in rotation of its shaft 47 and the crank arm 46 will effect vertical movements of the lifting rod 33 through the agency of the roller 45, cam slot 44 and plate 39 between a normal uppermost position as shown in full lines, and a lowermost position represented by the broken line showing of the parts 39, 41, 45 and 46 in FIGURE 4.

In connection with the operation of this basket lowering and raising mechanism, it is desirable to effect automatic lowering of the food-supporting basket into the cooking fat and raising of the same therefrom after a predetermined interval of time of immersion of the food in the cooking fat. To effect such control each of the independently operable basket raising mechanisms comprises an upper micro-switch 49 and a lower micro-switch 51. The switch 49 is mounted in any suitable manner in the upper portion of the associated bracket 38 forwardly thereof, with its control plunger extending downwardly for cooperation with a horizontally extending arm of a bracket 52. The outer portion of this bracket 52 is secured in any siutable manner to the plate 39. The lower micro-switch 51 is similarly mounted adjacent the lower end of the bracket 38 with its operating plunger extending upwardly therefrom for cooperation with, and actuation by, the inner end of the bracket 52 when the latter is carried to its lowermost position by the plate 39.

From the foregoing description, it now will better be understood how the several problems presented by wishing to provide means for independently supporting and vertically moving the individual food-supporting baskets in a twin basket deep fat fryer have been solved. Providing the lifting rod 33 for each basket positioned between the kettle 16 and the flue 18 and adjacent and interiorly of the side walls 12 and 14 of the casing, and the offset hanger 30 extending inwardly from the upper portion of each lifting rod for supporting one of the baskets, together with the movement-imparting member or plate 39 attached to the lower end of the lifting rod and the motor 48 and driving means disposed below the lower end of the flue, obviates the warping or distorting of the mechanism, maintains all of these parts within the outer confines of the casing 11, and avoids any obstruction to direct venting of the flue 18. As seen best in FIGURE 1, the flue 18 is open at its upper end and, in addition to the arrangement of the novel basket-supporting mechanism noted, that mechanism has no parts extending above this open upper end of the flue 18 when in their uppermost positions. The preferred manner of venting the flue 18 is to provide a hood (not illustrated herein) which extends downwardly and overlies the open upper end of the flue. Customarily such a hood has a horizontal cross-sectional area at its lower end conforming to the rear portion of the casing 11 extending forwardly from its rear wall 15 to the front wall of the flue 18.

The guide tube 34 comprises a very satisfactory means for slidably engaging the lifting rod 33 intermediate its ends for guiding vertical movements thereof, the most important feature being to reduce the friction resulting from vertical movements of the lifting rod to a minimum. The guide pads 41 mounted adjacent the front and rear ends of the plate 39 extend outwardly from the latter opposite the basket-supporting bracket 30 to resist the torque applied to the lifting rod by the associated food-supporting basket and reduce friction between the relatively movable parts to a minimum to insure against binding thereof because of that torque and to effect smooth and even vertical movements of the basket. The adjustability of these pads 41 through the use of their associated lock nuts 42 enables maximum efficiency in this regard, and the provision of the wear means 43 for frictional engagement by those pads obviates any deleterious effects on the casing of the fryer.

In operation, hanging of a basket 19 containing food, which it is desired to deep fat fry, on one of the hangers 26 and operation of the starter button switch forming part of the associated cycle timer 24 or 25 are the only manual actions required by the operator, other than a presetting of that cycle timer 24 or 25 to result in the food being retained immersed in the cooking fat for the desired period of time. The details of the operation and control of the associated motor 48 will be fully understood from reference to the complete disclosure of the corresponding control mechanisms given in my said copending application Serial No. 105,214. Briefly, closing of the starting switch associated with the pertinent cycle timer 24 or 25, which is a double-throw, single blade switch, moves the same from its normal position in series with the associated switch 49, normally held open by the associated bracket 52 when the basket-supporting mechanism is in its normal uppermost position, into series with the normally closed lower switch 51 to initiate operation of the motor 48 to swing the crank 46 downwardly from its normal uppermost position to its lowermost broken line position of FIGURE 4. Such movement of the double-throw timer switch also starts the motor of that cycle timer. As the bracket 52 thus is brought to its lowermost position, it will open the normally closed lower micro-switch 51 to de-energize the motor 48. At the end of the predetermined cooking cycle, as selected by the previous setting of that cycle timer 24 or 25, the motor 48 is again energized by the motor of that cycle timer returning the double-throw cycle timer switch into series with the closed switch 49 to return the associated lifting mechanism and the food supporting basket 19 carried thereby to their uppermost positions. As this normal positioning of that mechanism is accomplished, the bracket 52 again actuates the upper micro-switch 49 to open it and complete the cycle by de-energizing the motor 48.

It will be understood, of course, that any other desired control means may be employed, the important aspect of the instant invention residing in the novel lifting rod, offset hanger, rod guide means and movement-imparting mechanism which make possible the accomplishment of the desired end result of enabling use of the twin baskets of a deep fat fryer independently of each other without requiring the same to be manually immersed into, and lifted from, the cooking fat.

It is thought that invention and many of its attendant advantages will be understood from the foregoing description, and it will be apparent that various changes may be made in the form, construction, and arrangement of the parts without departing from the spirit and scope of the invention or sacrificing all of its material advantages, the form hereinbefore described and shown in the drawings being merely a preferred embodiment thereof.

I claim:

1. In a deep fat fryer having twin food-supporting baskets, a kettle, a vertical flue disposed rearwardly of the kettle in closely spaced relationship relative thereto, and an outer casing enclosing said kettle and flue in closely spaced relationship relative thereto; means for supporting and moving said baskets vertically independently of each other, comprising a lifting rod disposed between said kettle and said flue adjacent and interiorly of each lateral side wall of said casing, a hanger offset inwardly from the upper portion of each said lifting rod away from the adjacent said casing side wall for independently supporting one of said baskets, tubular guide means engaging said rod intermediate its ends, operating means including a movement-imparting member secured intermediate its ends to the lower end of each said lifting rod, and guide pads mounted on each said movement-imparting member adjacent the ends thereof for adjustment relative thereto laterally of said casing for resisting torque applied to the associated said lifting rod by the food-supporting basket supported thereby.

2. In a deep fat fryer having twin food-supporting baskets, a kettle for receiving said baskets, a vertical flue disposed rearwardly of the kettle, and an outer casing enclosing said kettle and flue; means for supporting and independently moving each said basket vertically, comprising a lifting rod disposed forwardly of said flue and interiorly of said casing, a hanger offset inwardly from the upper portion of said lifting rod for supporting a said basket, means slidably engaging said lifting rod intermediate its ends for guiding vertical movements thereof, operating means including a movement-imparting member secured intermediate its ends to the lower end of said lifting rod, and guide pads mounted adjacent the ends of said member and extending outwardly therefrom for resisting torque applied to the lifting rod by a said basket supported on said hanger.

3. A deep fat fryer according to claim 2, wherein said flue terminates in an open upper end, and said operating means is disposed below the upper end of said flue when in its uppermost position to avoid any obstruction to direct venting of the flue.

4. A deep fat fryer according to claim 2, wherein said guide pads are adjustable relative to said member, and wear means mounted interiorly of said casing for engagement by said pads.

References Cited by the Examiner

UNITED STATES PATENTS

| | | | |
|---|---|---|---|
| 2,546,464 | 3/1951 | Martin | 99—415 X |
| 2,550,758 | 5/1951 | Bemis. | |
| 2,568,792 | 9/1951 | Cripps | 99—407 X |
| 2,766,680 | 10/1956 | Tagliaferri | 99—404 |
| 2,875,682 | 3/1959 | Smoot et al. | 99—411 X |
| 3,026,790 | 3/1962 | Arvan | 99—407 X |
| 3,071,064 | 1/1963 | Horvath | 99—336 |

WALTER A. SCHEEL, *Primary Examiner.*